United States Patent [19]

Murray et al.

[11] 4,017,476
[45] Apr. 12, 1977

[54] PREPARATION OF FINELY DIVIDED STYRENE-DIVINYLBENZENE ORGANIC PIGMENTS

[75] Inventors: James G. Murray, East Brunswick; Frederick C. Schwab, Metuchen, both of N.J.

[73] Assignee: Mobil Oil Corporation, New York, N.Y.

[22] Filed: Mar. 15, 1974

[21] Appl. No.: 451,405

[52] U.S. Cl. .................. 260/144; 106/288 Q; 106/308 N; 260/42.21; 260/327 S; 260/378; 260/395; 260/875; 260/878 R; 260/878 B; 260/880 R; 260/880 B; 526/82

[51] Int. Cl.² ............ C09B 31/30; C09B 43/00; C09B 1/16; C09B 11/06

[58] Field of Search ............ 260/144, 378, 42.21, 260/880 R, 880 B, 878 R, 878 B, 80.7, 80.78, 395, 875, 327 S; 106/288 Q, 308 N

[56] References Cited

UNITED STATES PATENTS

| | | | |
|---|---|---|---|
| 2,500,023 | 3/1950 | Burk | 260/42.21 |
| 3,232,691 | 2/1966 | Wilhelm et al. | 260/144 X |
| 3,278,486 | 10/1966 | Meek et al. | 260/144 UX |
| 3,337,288 | 8/1967 | Horiguchi et al. | 260/144 X |
| 3,340,221 | 9/1967 | Goldberg et al. | 260/144 X |
| 3,467,642 | 9/1969 | Horiguchi et al. | 260/141 |
| 3,563,931 | 2/1971 | Horiguchi et al. | 260/141 X |
| 3,632,288 | 1/1972 | Niechwiadowicz et al. | 260/42.21 X X |

FOREIGN PATENTS OR APPLICATIONS 7,112,489  12/1971  Netherlands ............ 260/141

OTHER PUBLICATIONS

Winnicki et al., Chemical Abstracts vol. 78, No. 72919q (1973).

Primary Examiner—Floyd D. Higel
Attorney, Agent, or Firm—Charles A. Huggett; Hastings S. Trigg

[57] ABSTRACT

Organic pigments for thermoplastic polymers are prepared by the anionic initiated slurry polymerization of styrene and 0.5–15 weight percent divinylbenzene based upon styrene in the presence of a block polymer dispersant, using, as the anionic initiator, an alkali metal-bearing compound at 20° C. to 120° C. to produce a finely divided solid cross-linked polymer and terminating the polymerization by reaction of the polymer particles with an organic dye, an organic dye precursor, or with a reactive coupling agent followed by reaction with an organic dye.

14 Claims, No Drawings

PREPARATION OF FINELY DIVIDED STYRENE-DIVINYLBENZENE ORGANIC PIGMENTS

BACKGROUND OF THE INVENTION

1. Field of the Invention

This invention is concerned with organic pigments for thermoplastic polymers and their preparation.

2. Description of the Prior Art

Organic pigments are generally prepared by precipitating an organic dye having an ionic group with a metal salt to form an insoluble salt (lake) of the dye.

SUMMARY OF THE INVENTION

Organic pigments for thermoplastic polymers are prepared by anionic initiated slurry polymerization of styrene and divinylbenzene in the presence of a block polymer dispersant that controls the particles of the resulting cross-linked polymer to a fine size, desirably less than 2000 A, and under conditions of anionic intiator and reactant usage and terminating the polymerization by reaction of the polymer particles with an organic dye or with a reactive coupling agent followed by reaction with an organic dye.

DESCRIPTION OF SPECIFIC EMBODIMENTS

The organic pigments contemplated herein are prepared by slurry polymerization of styrene and divinylbenzene utilizing, as an anionic initiator, an alkali metal-bearing compound capable of initiating the polymerization of styrene, in the presence of an AB or ABA block polymer dispersant, and terminating the polymerization with an organic dye or with a reactive coupling agent followed by reaction with an organic dye.

In the slurry polymerization process contemplated herein, the divinylbenzene (o-, p-, or mixed isomers) serves as a cross-linking agent and is generally used in an amount of between about 0.5 and 15.0 weight percent based on the styrene reactant.

The anionic initiator useful for the practice of this invention is an alkali metal-bearing initiator typified by alkali metal alkyls including, in exemplification, butyllithium, sec-butyl lithium, amyl lithium, ethyl lithium, etc. as well as their corresponding sodium compounds; lithium or sodium salts of materials, such as alpha methyl styrene, 1,1-diphenylethylene, napthalene and others. Such materials, when used as the anionic initiators, result in a cross-linked "living" polymer from the slurry polymerization embodied herein whereby the slurry polymerization is terminated by certain coupling agents which result in a particle suitable for use as a pigment.

The amount of anionic catalyst or initiator that is used is generally in the range of $10^{-1}$ to $10^{-4}$ moles per 100 grams of styrene reactant.

The slurrying medium for the polymerization reaction is an aliphatic hydrocarbon, liquid at the conditions of operation of the slurry polymerization, that is not reactive with the anionic initiator. The aliphatic hydrocarbon can be normal or branched chain, paraffinic or monoolefinic of at least three carbon atoms and, more desirably, of four to seven carbon atoms content. Typical slurrying media include butane, pentane, isopentane, hexane, heptane, 2,2-dimethylbutane, butene, pentene, as well as mixtures such as petroleum ether, pentene-pentene, hexane-hexene.

The polymerization process of the invention is carried out at temperatures between about 20° C. and about 120° C. The desired polymerizaton temperature is determined in part by the reflux temperature of the slurrying medium. It is, however, within the contemplation of this invention to use pressure in order to elevate the reflux temperature of the slurrying medium.

The block polymer dispersing agent, generally used in an amount of about 0.1 to about 10 weight percent of the styrene reactant, used to prepare the fine particle filler materials is preferably an AB or ABA block polymer. In the block polymer segment A is preferably derived from styrene in amounts from 5 – 80 weight percent styrene (preferably, about 5 – 50 weight percent) based on total block polymer. Segment B is based on monomers which polymerize to form a polymer readily soluble in a aliphatic hydrocarbons and which does not readily react with the styryl anion. Sutable monomers for the formation of the B segment of the block polymer include an alkyl styrene such as t-butylstyrene, butadiene, isoprene, 2,2-dimethylbutadiene and the like and copolymers of the above dienes with styrene or alkyl styrenes.

The following Examples illustrate preparation of block polymers useful in practice of this invention.

EXAMPLE 1

In a reaction vessel equipped with a reflux condenser and agitation means were added 21 ml. of t-butylstyrene and 375 ml. of benzene. The solution was degassed by the application of a vacuum, followed by replacement with nitrogen. This step was repeated several times to insure proper degassing. A slight stream of nitrogen was continued throughout the ensueing polymerization reaction. A quantity of 1.9 ml. of 0.5 M sec-butyl lithium was added to initiate the reaction and the temperature was raised to 75° C. The polymerization was continued for 45 minutes. At this time 64 ml. of purified styrene monomer was added to the reactor and polymerization was allowed to proceed for an additional 30 minutes. The block polymer was separated from solution by precipitation in methanol. The reaction produced 74 grams of a block polymer containing 75 percent styrene by weight. Molecular weight data for this block polymer are set forth in Table I.

EXAMPLES 2 – 6

Using the procedure of Example 1, other t-butylstyrene-styrene block polymers were prepared and molecular weight data were obtained. Pertinent data are set forth in Table I.

TABLE I

| Example | % t-butylstyrene | % styrene | Ms × $10^{-3}$ (gms/mole) |
|---------|------------------|-----------|----------------------------|
| 1 | 25 | 75 | 80 |
| 2 | 90 | 10 | 98 |
| 3 | 85 | 15 | 98 |
| 4 | 80 | 20 | 98 |
| 5 | 75 | 25 | 80 |
| 6 | 50 | 50 | 80 |

The following examples illustrate the preparation of dispersants other than of styrene and t-butyl-styrene:

EXAMPLE 7

An AB styrene-butadiene block copolymer was prepared by adding 0.9 ml. of 1.18 N sec-butyl lithium to a mixture of 20 g. of styrene in 350 ml. of benzene and 5 ml. of tetrahydrofuran under anhydrous air free conditions. After polymerization for 1 hour and 20 minutes at room temperature, 30 g. butadiene was distilled into the flask from over triethyl aluminum. After 2.5 hours additional reaction at room temperature, the reaction was terminated by addition of methanol and the product isolated by precipitation into a large volume of methanol. After filtration and drying there was isolated 48.7 g. of a polystyrene-butadiene block copolymer having blocks of polystyrene of 20,000 molecular weight and polybutadiene of 30,000 molecular weight.

EXAMPLE 8

An AB block polymer of styrene-isoprene was prepared by adding 0.42 ml. of 1.18 N sec-butyl lithium to a mixture of 10 g. styrene of 175 ml. of benzene and 5 ml. of tetrahydrofuran at room temperature. The mixture was allowed to polymerize for 2 hours and 40 g. of dry air-free isoprene was added and the polymerization continued for 2 additional hours. The product was isolated by precipitation into methanol, yielding 27.5 g. of block polymer dispersant.

As has been indicated hereinbefore, the product of the anionic slurry polymerization is a "living" styrene-divinylbenzene cross-linked polymer in fine particle size. This living polymer contains active anionic lithium or sodium end groups that are further reacted (terminated) with a dye (or dye precursor) or a coupling agent and a dye (or dye precursor) to produce the organic pigments of this invention. As contemplated herein, the dye is any dyestuff that has a functional group that will react or couple, with the living polymer end or with a functional group on a coupling agent. A dye precursor is a similar compound having functional groups that can be further reacted, such as with acids, to form a dye. A coupling agent is a compound having two or more functional groups that can react with the polymer end and still have remaining at least one functional group that can react with a dye or dye precursor. Suitable functional groups that can react or couple with a polymer end or with a dye molecule are isocyanates, acid halides, sulfonyl halides, benzylic halides and thiocyanates. Additionally, the living polymer can couple with ketones, aldehydes, esters, nitriles, and sulfones. The dye, dye precursor, or coupling agent can have any compatible combination of these functional groups.

Suitable dyes utilizable in the process of this invention are 4-phenylazophenol, 4-phenylazoresorcinol, 1,4-di-(isopropylamino) anthraquinone, p-dimethylaminoazobenzene, chrysodine, phenol red, bromphenol blue, or generally any dye which has suitable functionality for forming a chemical bond with the reactive group of the coupling agent.

Suitable dye precursors are 4,4'(bis-dimethylamino) benzophenone and 4,4'-(bis-diethylamino) benzophenone.

Suitable coupling agents are tolylene-2,4-diisocyanate, 4,4'-biphenyl diisocyanate, methylenedi-p-phenyl diisocyanate, m-benzenedisulfonyl chloride, isophthaloyl chloride, terephthaloyl chloride, 1,4 (bis-chloromethyl) benzene and tolylene-2,4-diisothiocyanate.

EXAMPLE 9

A polystyrene-divinylbenzene emulsion having reactive terminal lithium groups was prepared in the following manner. A solution of 30 g. styrene, 3.0 g. of 55% mixed divinylbenzenes and 1.5 g. of an AB block copolymer p-t-butylstyrene-styrene of Example 4 was prepared in 500 ml. of hexane using anhydrous conditions under nitrogen. Polymerizaton was initiated at room temperature by addition of 8.4 ml. of 1.3 N sec-butyllithium solution in hexane and the mixture was heated to 60° C. for ½ hour with stirring.

A solution of 3.5 g. of 4,4'-Bis(dimethylamino) benzophenone in dry, air free tetrahydrofuran was added. The resulting mixture was stirred for 10 minutes to complete the reaction of the active lithium groups to the polymer particles with the ketone carbonyl. Part of this reaction product was then converted to a deep green pigment by treatment with iodine followed by aqueous concentrated HCl and methanol. A second portion of this solution was converted to a dark blue pigment by air oxidation of the mixture at room temperature followed by acidification with dilute sulfuric acid. A third portion of the product was converted to a turquoise pigment by air oxidation and treatment with aqueous hydrochloric acid.

EXAMPLES 10 – 12

An emulsion of styrene-divinylbenzene particles having reactive terminal lithium groups was prepared as above in 450 ml. of hexane using 30 g. styrene, 1.5 g. of divinylbenzene, 1.6 g. dispersant and 8.4 ml. of 1.3 N butyl lithium solution. Fifty ml. aliquots of this solution were then reacted with 0.28 ml. of tolylene-2,4-diisocyanate at room temperature overnight followed by reaction with 0.10 ml. of acetyl chloride to form particles having reactive isocyanate groups attached.

To carry out coupling reactions, the dyes listed in Table II were dissolved in 50 ml. of xylene and mixed with 50 ml. aliquots of the above mixtures. Excess hexane was distilled under reduced pressure and the mixtures allowed to stand for several days. The pigments were isolated by pouring into acetone and filtering and washing with acetone to remove any unreacted dye. The resulting pigment colors are given in Table II.

TABLE II

| Example | Dye | Pigment Color |
|---|---|---|
| 10 | 4-phenylazophenol | Yellow |
| 11 | 4-phenylazoresorcinol | Orange |
| 12 | 1,4,di-(isopropylamino) anthraquinone | Dark Blue |

As will be noted from the examples, the living polymer chain ends can be reacted with a large variety of organic soluble dyes or dye precursors either directly or through intermediate coupling agents with formation of useful organic pigments. These pigments have the following advantages over prior art materials: a. The colorant molecules are uniformly distributed on particles of easily controlled size resulting in a high effectiveness for a given amount of color body. b. The pigment particles can readily be formed or prepared as emulsions in a variety or organic solvents for easy incorporation into the products that are to be colored. c. The dye molecules are attached to the filler particles by strong primary chemical bonds so there will be no bleeding tendency as is commonly encountered with organic pigments. d. The pigment particles can be prepared in size ranges which will make them strong reinforcing fillers and this will be a secondary benefit in many plastics and rubber applications. e. The dye molecules used do not require an ionic and water solubilizing group as is required for preparation of most lakes and toners. f. The pigment particles can be easily modified chemically to provide the maximum degree of dispersability or to impart other useful properties to the pigment.

The pigments prepared by this invention are useful as colorants in rubber, coatings, fibers, thermoplastic and thermoset polymers, etc. The thermoplastic polymers that can be colored by incorporation of the pigments of this invention include polyethylene, polypropylene, polystyrene, polyvinyl chloride, polyethylene terephthalate, polycarbonate, etc.

The pigments can be incorporated into these polymers by conventional techniques, such as direct extrusion blending of the powder or by making a master batch of the resin powder in pellets of the polymer and tumble mixing of these with the resin pellets before extrusion.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for producing an organic pigment that comprises slurry polymerizing a reaction mixture comprising styrene, 0.5 to 15.0 weight percent divinylbenzene based upon styrene, and an anionic polymerization initiator dispersed in a liquid aliphatic hydrocarbon slurrying medium in presence of from about 0.1 to about 10 weight percent, based upon styrene, of a block polymer dispersing agent to produce a finely divided solid cross-linked polymer, at a temperature between about 20° C. and about 120° C., said anionic polymerization initiator comprising an alkali metal-bearing compound capable of initiating polymerization of styrene, and terminating the slurry polymerization, with an organic dye, an organic dye precursor selected from the group consisting of 4,4′(bis-dimethylamino)-benzophenone and 4,4′(bis-diethylamino)benzophenone, or a coupling agent and a dye.

2. A process, as defined in claim 1, carried out with an initiator which is an alkali metal salt of a monomeric hydrocarbon compound.

3. A process, as defined in claim 2, wherein the initiator is alkyl lithium.

4. A process, as defined in claim 3, wherein the initiator is butyllithium.

5. A process, as defined in claim 4, carried out in presence of a liquid aliphatic hydrocarbon of four to seven carbon atom content as the slurrying medium and an AB or ABA block polymer dispersant in which segment A is comprised of polystyrene blocks and B of hydrocarbon soluble blocks, with A in amount of about 5 to about 80 weight percent of the total block polymer.

6. A process, as defined in claim 5, wherein the block polymer dispersant is a block polymer of styrene and 80% of the total block polymer of t-butylstyrene.

7. A process, as defined in claim 6, wherein the polymerization reaction to form the finely-divided solid polymer is terminated by reacting said finely-divided cross-linked polymer with an organic dye precursor.

8. A process, as defined in claim 7, wherein said dye precursor is 4,4′ -bis(dimethylamino) benzophenone and is further reacted with iodine and HCl-methanol.

9. A process, as defined in claim 7, wherein said dye precursor is 4,4′-bis(dimethylamino) benzophenone and is further reacted with air and dilute sulphuric acid.

10. A process, as defined in claim 7, wherein said dye precursor is 4,4′-bis(dimethylamino) benzophenone and is further reacted with air and dilute hydrochloric acid.

11. A process, as defined in claim 6, wherein the polymerization reaction to form the finely-divided solid polymer is terminated by reacting said finely-divided cross-linked polymer with a coupling agent and a dye.

12. A process, as defined in claim 11, wherein said coupling agent is tolylene-2,4-diisocyanate and said dye is 4-phenylazophenol.

13. A process, as defined in claim 11, wherein said coupling agent is tolylene-2,4-diisocyanate and said dye 4-phenylazoresorcinol.

14. A process, as defined in claim 11, wherein said coupling agent is tolylene-2,4-diisocyanate and said dye is 1,4-di(isopropylamino) anthraquinone.

* * * * *

UNITED STATES PATENT AND TRADEMARK OFFICE
CERTIFICATE OF CORRECTION

PATENT NO. : 4,017,476
DATED : April 12, 1977
INVENTOR(S) : JAMES G. MURRAY and FREDERICK C. SCHWAB It is certified that error appears in the above-identified patent and that said Letters Patent are hereby corrected as shown below:

| | |
|---|---|
| Column 1, line 68 | "pentene-pentene" should be --pentane-pentene |
| Column 2, line 18 | "Sutable" should be --Suitable-- |
| Column 3, line 17 | "styrene of 175 ml." should be --styrene, 175 ml.-- |

Signed and Sealed this

Twentieth Day of September 1977

[SEAL]

Attest:

RUTH C. MASON
Attesting Officer

LUTRELLE F. PARKER
Acting Commissioner of Patents and Trademarks